Feb. 8, 1938.  E. WILDHABER  2,107,460

METHOD OF AND MECHANISM FOR PRODUCING GEARS

Filed Aug. 1, 1935  5 Sheets-Sheet 1

Inventor
Ernest Wildhaber
By
B. E. Shlesinger
Attorney

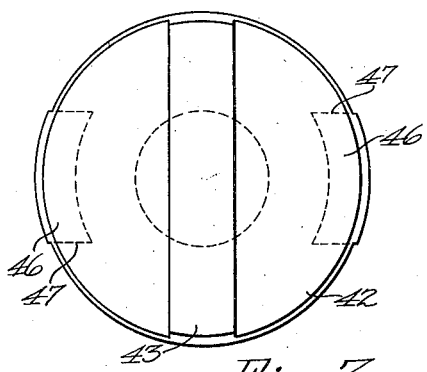
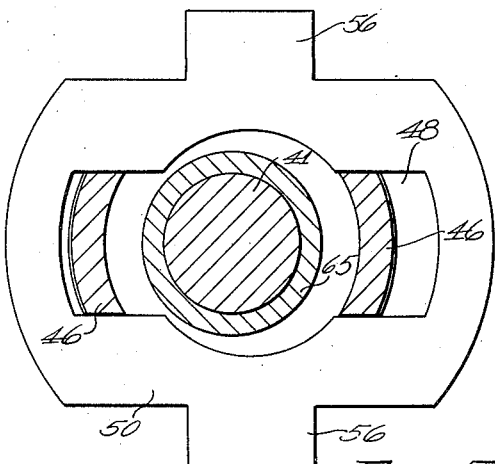
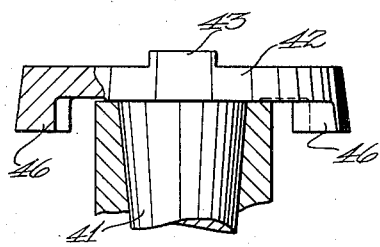
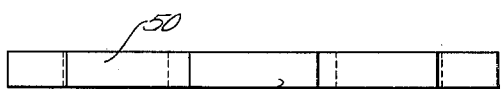
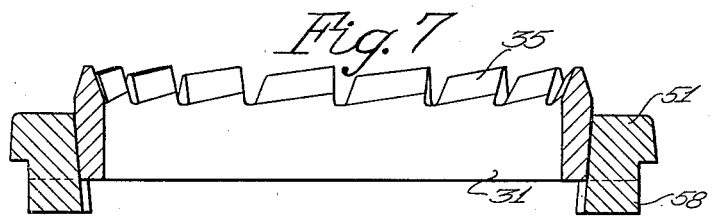
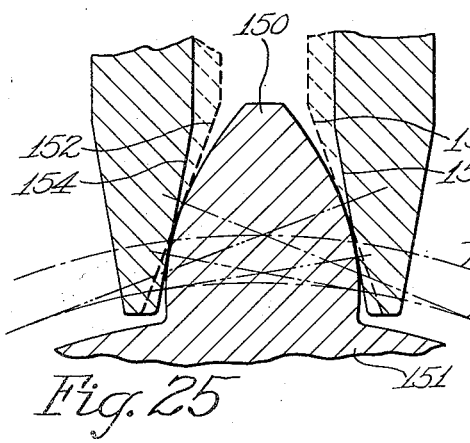
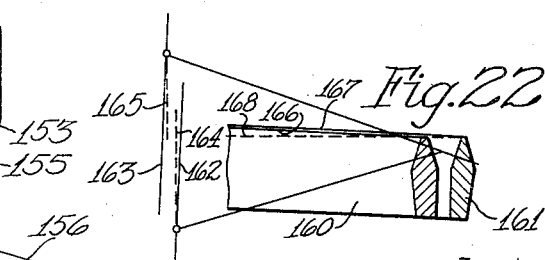

Feb. 8, 1938. E. WILDHABER 2,107,460
METHOD OF AND MECHANISM FOR PRODUCING GEARS
Filed Aug. 1, 1935 5 Sheets-Sheet 3

Inventor
Ernest Wildhaber
By
B. G. Schlesinger
Attorney

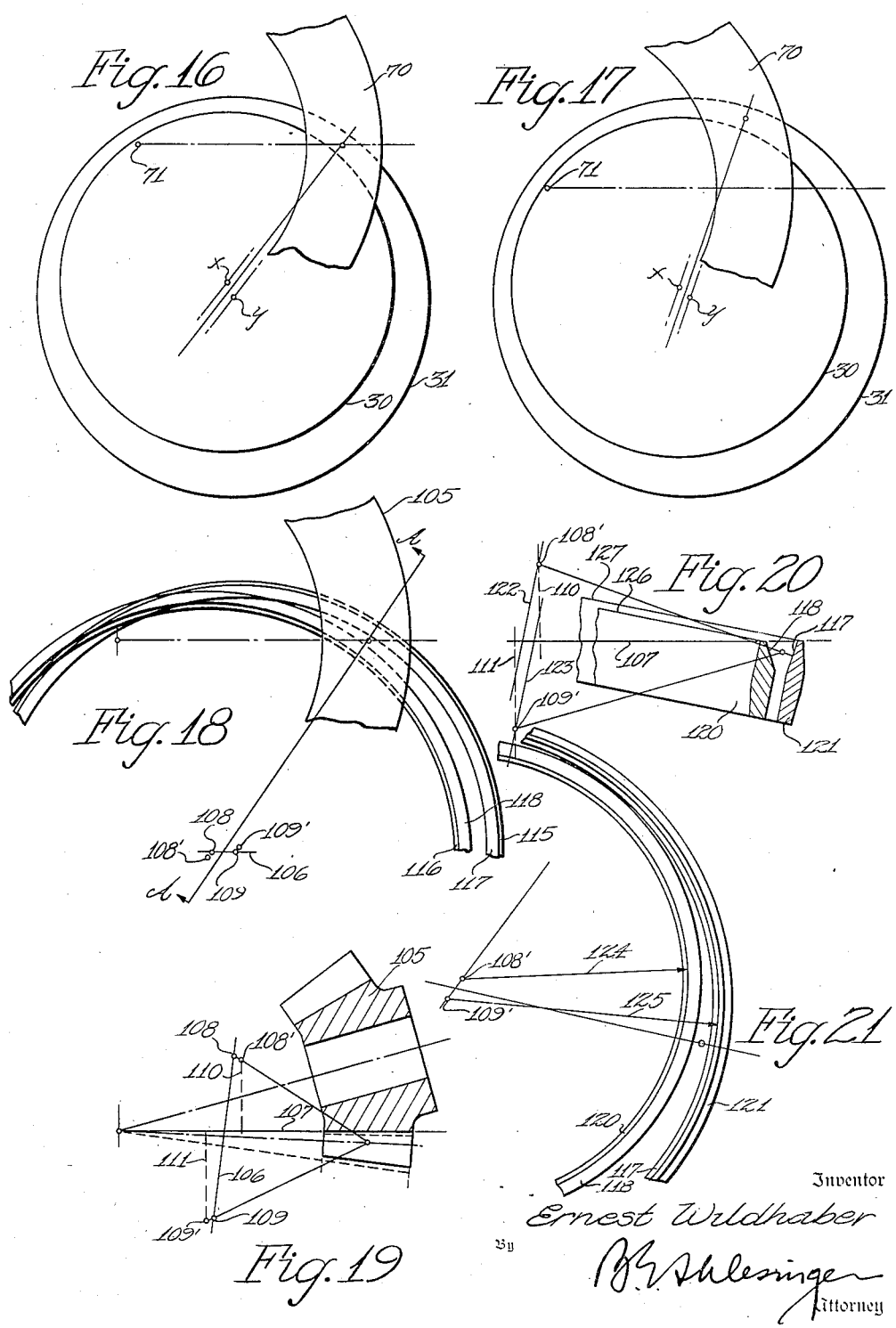

Patented Feb. 8, 1938

2,107,460

UNITED STATES PATENT OFFICE 2,107,460

METHOD OF AND MECHANISM FOR PRODUCING GEARS

Ernest Wildhaber, Irondequoit, N. Y., assignor to Gleason Works, Rochester, N. Y., a corporation of New York Application August 1, 1935, Serial No. 34,238

24 Claims. (Cl. 90—4)

The present invention relates to the production of longitudinally curved tooth gears, particularly spiral bevel and hypoid gears and to tool mechanism for producing such gears.

One object of the invention is to provide cutting mechanism for finish cutting simultaneously the two sides of a tooth of a longitudinally curved tooth gear.

A further object of the invention is to provide cutting mechanism for cutting simultaneously the two sides of a gear tooth of tapering width such as a tooth of a spiral bevel or hypoid gear.

Another object of the invention is to provide a gear cutting method and mechanism whereby a spiral bevel or hypoid pinion may be finish-cut direct from the solid in a single continuous operation without set-over of tool or blank, thereby reducing the cutting of spiral bevel and hypoid pinions to a single operation and set-up in place of the three operations and set-ups heretofore required.

Still another object of the invention is to provide a cutting mechanism and method whereby a tooth space of a longitudinally curved tooth generated gear may be roughed out during feed and relative roll of the tool mechanism and blank in one direction and the opposite sides of a tooth of the gear may be finish-cut during relative roll in the opposite direction.

A further object of the invention is to provide a method of cutting longitudinally curved tooth gears direct from the solid in which the finishing cuts are taken by different cutting edges from those that take the roughing cuts so that the finish cutting edges are saved for the finishing work and the gear produced by the present method has tooth surfaces equally as smooth as those produced by prior known methods which employ separate roughing and finishing operations.

Another object of the invention is to provide a tool mechanism for cutting spiral bevel and hypoid gears comprising a pair of eccentrically mounted face-mill gear cutters for cutting opposite sides of a gear tooth simultaneously which are adjustable relative to one another so as to vary the amount of their eccentricity and thereby the amount of mismatch of curvature of opposite sides of the teeth of a pair of mating gears.

Still another object of the invention is to provide a drive for a pair of eccentrically mounted face-mill gear cutters which will permit of free adjustment of the cutters relative to one another so as to vary their eccentricity.

Another object of the invention is to provide a tool mechanism for cutting longitudinally curved tooth gears comprising a pair of eccentrically mounted face-mill cutters in which each cutter may have the same number of cutting blades or teeth as the single cutters ordinarily employed in the cutting of spiral bevel and hypoid gears.

Another object of the invention is to provide a method for simultaneously finishing both sides of a tooth of a spiral bevel or hypoid gear with a pair of eccentrically mounted face-mill gear cutters in which the cutters have conical cutting surfaces and in which a correction for "bias-bearing" may simultaneously be provided on both sides of the tooth.

A still further object of the invention is to provide a method of finish cutting both members of a pair of tapered gears in which two tooth sides of each member are cut simultaneously and which avoid the restrictions as to tooth proportions and cutter diameters previously imposed upon such methods.

Other objects of the invention will be apparent hereinafter from the specification and from the recital of the appended claims.

The invention of this application is an improvement upon the invention of my co-pending application, Serial No. 33,833 filed July 30, 1935.

A preferred embodiment of the invention is illustrated in the accompanying drawings in which:

Fig. 3 is an end view and Fig. 4 a sectional view in reduced scale of the tool spindle shown in Figs. 1 and 2 and illustrating the manner of driving the inner cutter;

Fig. 5 is a plan view of the slidable key through which the drive is imparted to the outer cutter and showing in section how this cutter is connected to the tool spindle;

Fig. 6 is a side elevation of this key;

Fig. 7 is a sectional view of the outer cutter taken at right angles to the section shown in Fig. 2;

Figure 8:
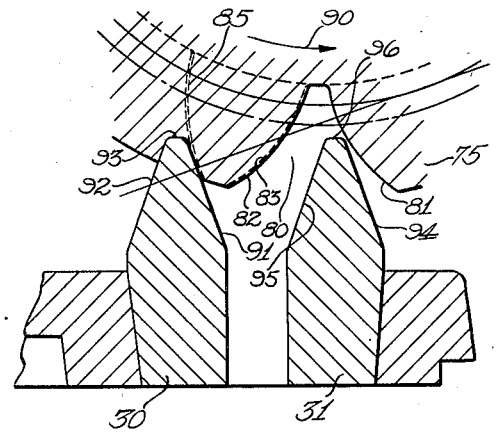
Figure 9:
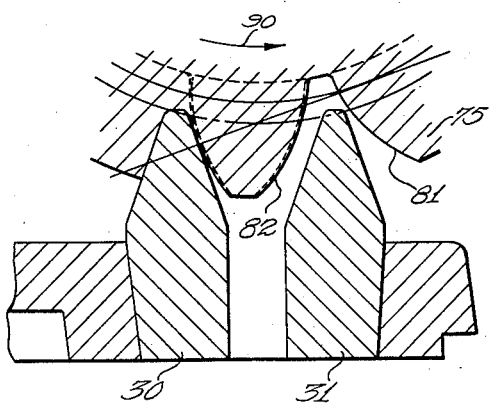
Figure 10:
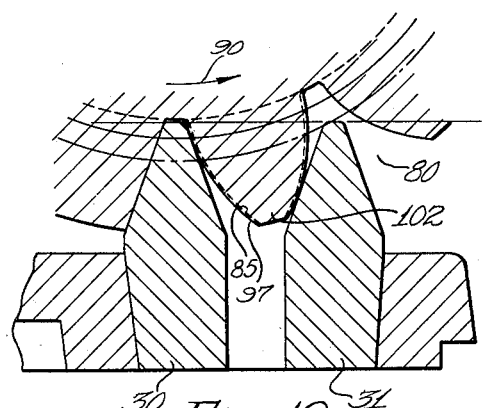
Figure 11:
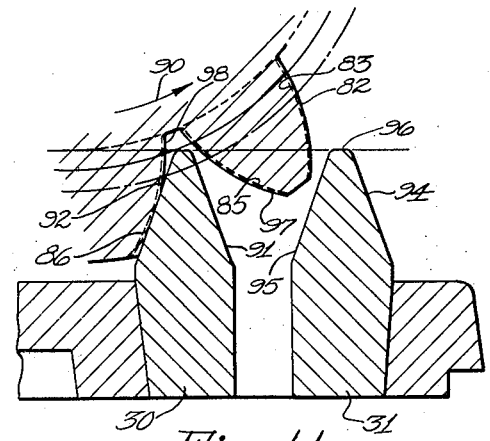
Figure 12:
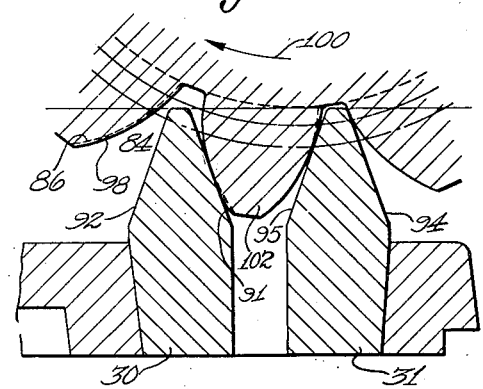
Figure 13:
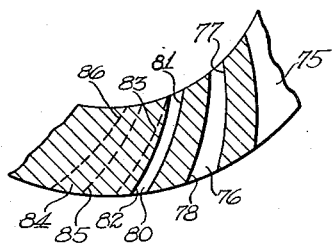
Figure 14:
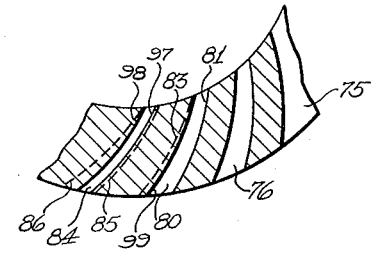
Figure 15:
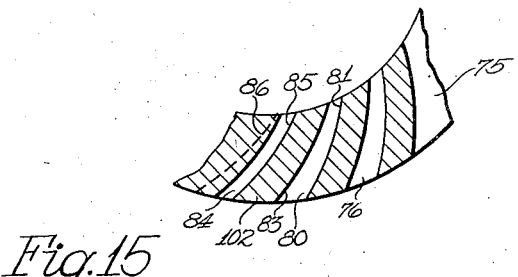

Figs. 8 to 12 inclusive are diagrammatic views illustrating different steps in the roughing out of a tooth slot and the finish cutting of opposite sides of a tooth of a gear by the method of the present invention, Figs. 8, 9 and 10 showing different positions of the tools and the blanks during the feed of the tools into full depth position, Fig. 11 showing one position of the tools and the blank after the tools have reached full depth position and while the blank is still rolling in the same direction as during feed, and Fig. 12 showing one of the positions of the tools and blank after the roll has been reversed and while the tools are finish cutting opposite sides of a tooth at one side of the tooth slot previously roughed out;

Figs. 13, 14 and 15 are diagrammatic views taken in the root plane of the gear being cut and further illustrating the different steps in the process of cutting a gear according to the present invention;

Figs. 16 and 17 are diagrammatic views explanatory of the use of the cutters; and Fig. 18 is a diagrammatic view of a pair of cutters and a pinion blank and Fig. 19 is a sectional view of the pinion blank, illustrating the difficulty of interference of the cutters that arises when efforts are made to cut opposite sides of the teeth of the pinion with different radii of curvature as is customary practice;

Figs. 20 and 21 are a sectional view and a fragmentary side elevation, respectively, illustrating how the interference may be avoided by tilting the cutter, Fig. 20 being a section corresponding to a section along the line A—A of Fig. 18;

Fig. 22 is a sectional view of a pair of conical cutters often employed in accordance with the present invention and having tips of different position along the cutter axis.

Figure 23:
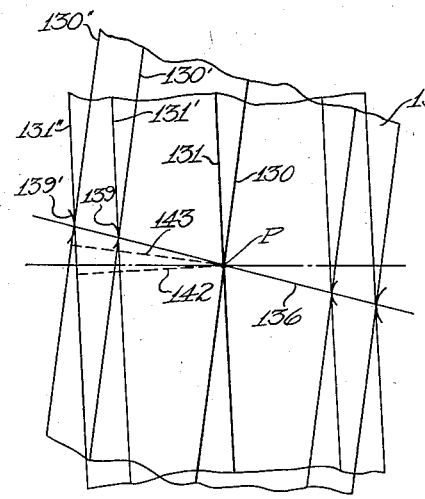
Figure 24:
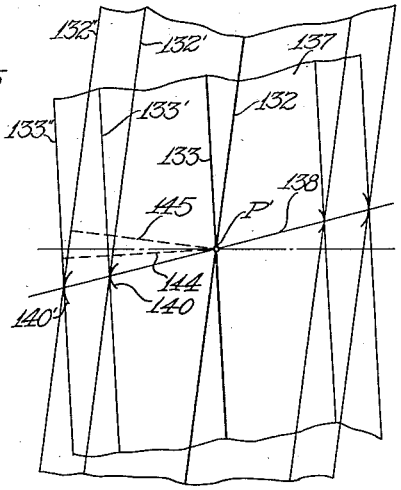

Figs. 23 and 24 are normal views in planes tangent, respectively, to opposite sides of a pinion tooth, and further illustrating the method of avoiding "bias-bearing"; and Fig. 25 is a diagrammatic view illustrating how interference between the cutters may also be avoided by change of pressure angle of the cutters and roll of the work on a surface different from its pitch surface.

While the present invention has application to the production of various kinds of longitudinally curved tooth gears, it is particularly applicable to the production of spiral bevel and hypoid gears and it is in connection with the production of such gears that the invention will be described. As already indicated, a pair of face-mill cutters are employed consisting of an inner cutter and an outer cutter, which are preferably arranged to cut in the adjacent tooth spaces and which are eccentrically mounted with reference to one another. In the production of automotive pinions, this arrangement is especially satisfactory for, on account of the long addendum usually provided on such pinions, the contact of the tool with a side of the tooth being cut at the mean position of the generating roll is about mid-way on the line of action. The roll required for generating the two sides of the pinion tooth is therefore no longer than the roll required for generating a single side thereof inasmuch as the finishing cut is started at the same time on both sides and completed at the same time on both sides. Therefore, the two face-mill cutters operating in adjacent tooth spaces would require no greater roll to fully generate the opposite sides of a pinion tooth than would be required under standard practice to generate one side of the tooth.

The two eccentric cutters have a full number of cutting blades or teeth, that is, as many as any ordinary face-mill gear cutter.

In cutting gears according to the present invention, the cutters are preferably fed into the gear blank while the blank is being rotated on its axis at such a rate relative to the feed movement that the cutting edges at one side of one cutter follow the tooth profile at one side of the tooth space of the gear blank in which that cutter is operating. Except in the case of the first two tooth spaces of the blank, then, the tooth space is roughed out principally by the other side and the tip of this cutter.

The first two tooth spaces are roughed out by the tips and the side cutting edges of one side of each of the two cutters. When the cutters have reached full depth position, the feed movement is discontinued but the relative roll of the cutters and blank is continued in the same direction as during feed far enough so as to complete the rough generation of the tooth slot or, in the case of the first two tooth slots, one side of each of the first two tooth slots to approximate finished profile curvature. Then the roll is reversed and the adjacent cutting edges of the two cutters which have done little or no cutting during the feed movement, finish generate the opposite sides of the tooth lying between the tooth slots in which the cutters are operating.

Preferably the cutters are made in the form of continuous rings which are gashed and relieved to provide cutting teeth according to the invention of my pending application Serial No. 22,304 of May 20, 1935.

Figure 1:
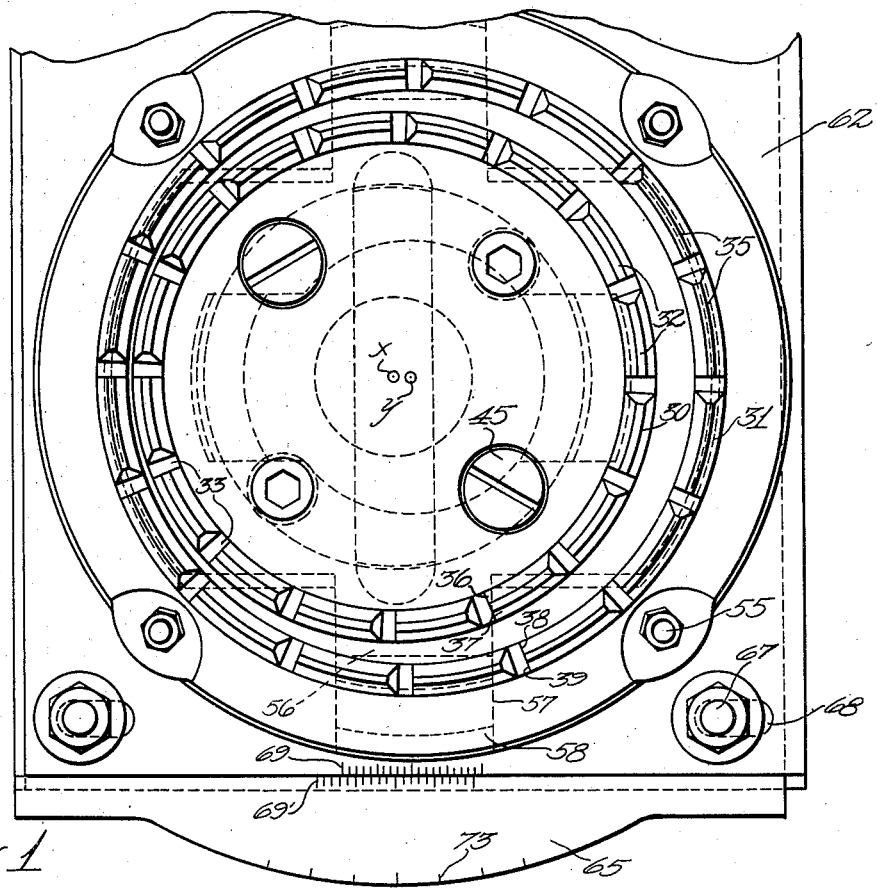
Fig. 1 is a side elevation and Fig. 2 is a sectional view of a cutter mechanism constructed according to the invention.
Figure 2:
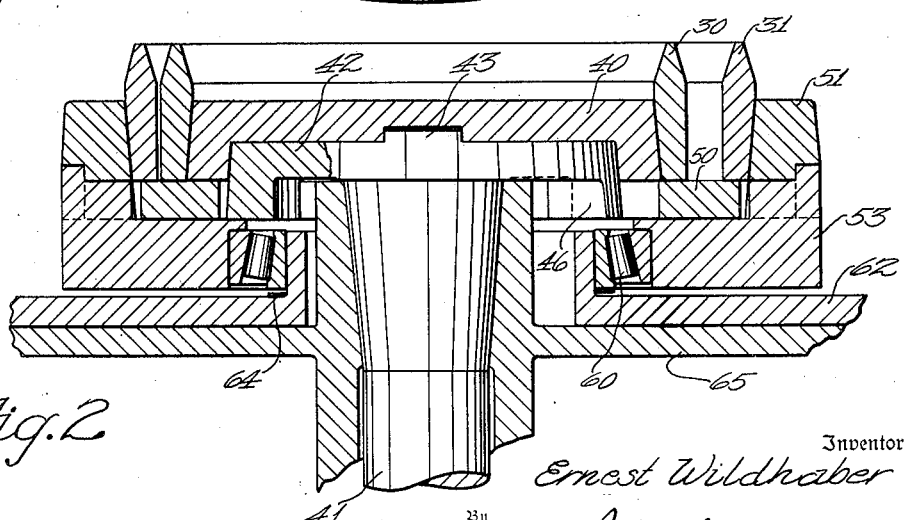

In Figs. 1 and 2, the inner cutter is designated at 30 and the outer cutter at 31. The cutting teeth 32 of the inner cutter are formed by providing gashes 33 in a continuous ring and grinding the sides and tips of the teeth so formed to provide cutting clearance back of their side and tip cutting edges. The cutting teeth 35 of the outer cutter 31 are formed in the same way. It will be noted that in the embodiment of the invention shown, the two cutters have the full number of cutting teeth. The teeth of the two cutters may be sharpened so that alternate teeth have opposite side cutting edges or, as shown, the teeth may be sharpened so that each tooth has cutting edges 36 and 37, in the case of the cutter 30, and 38 and 39, in the case of the cutter 31 at its opposite sides.

The inner cutter 30 is rigidly secured in any suitable manner to a cutter body or head 40 which is mounted upon the cutter spindle 41 of the gear cutting machine. The cutter spindle is formed at its front end with a disc-shaped end or seat 42 to receive the cutter body 40 and this seat 42 is formed with a key-like projection 43 (Figs. 3 and 4) which engages in a recess formed in the cutter body 40 to drive the cutter 30 on rotation of the cutter spindle. Bolts 45 (Fig. 1) may also be employed to further secure the cutter 30 on the cutter spindle against rotation relative thereto.

The disc-shaped end of the spindle 41 is also provided with two wing-like projections 46 which are diametrically opposed and which extend backwardly. These projections have flat sides 47 and engage in an elongated slot 48 formed in a floating key member 50 (Figs. 5 and 6).

The outer cutter 31 is rigidly secured in any suitable manner to a cutter holder or head 51 and this in turn is secured to a plate 53 by bolts 55.

The floating key member 50 is provided with opposed projections 56 which engage in a slot 57 formed in the plate 53, as clearly shown in Figs. 1 and 2. The outside ends of said slot are closed by projections 58 formed at diametrically opposed points on the cutter body 51 and which project into the slot 57. The projections 58 projecting as they do into the slot 57 also serve as a connection between the plate 53 and the cutter body 51.

The inner cutter, as described, is rigidly mounted in an axially fixed position on the cutter spindle 41. The outer cutter 31 is centered by a roller bearing 60 (Fig. 2) by which the plate 53 is mounted on an adjustable carrier 62. The bearing 60 and plate 53 are thrust forwardly by a spring-plate 64 (Fig. 2) so that the outer cutter is maintained in alignment with the inner cutter.

The adjustable carrier 62 is slidably adjustable on a support 65 which is mounted coaxially with the cutter spindle 41 and the inner cutter 30. The support 65 is formed with the bearings for the cutter spindle.

The carrier 62 is secured to the support 65 in any position of its adjustment by bolts 67 (Fig. 1) which pass through elongated slots 68 in the plate 62 and which thread into the support 65. The sliding adjustment of the plate 62 upon the support 65 permits of varying the eccentricity of the two cutters, that is, the amount of offset of the axis $x$ of the inner cutter from the axis $y$ of the outer cutter. The plate 62 and support 65 are graduated, as indicated at 69, 69' in Fig. 1, to permit this adjustment to be made accurately.

The support 65 is rotatably adjustable about the axis of the cutter spindle 41. The purpose of this adjustment will be apparent from a consideration of Figs. 16 and 17 which are diagrammatic views showing different positions of the cutters relative to a crown gear 70 or other basic gear in different positions of roll of the cutters about the axis 71 of said gear. The cutters are indicated diagrammatically by the circles 30 and 31. It is desirable to adjust the cutter centers $x$ and $y$ to any predetermined position and not necessarily in line with a radius drawn through the center 71 of the gear. This angular adjustment of the support 65 permits of making this adjustment. The graduations 73 on the support 65 permit of making this adjustment accurately.

The two cutters are preferably adjusted relative to one another so as to operate, respectively, in two adjacent tooth spaces of a gear blank. This preferred method of operation is illustrated diagrammatically in Figs. 8 to 15 inclusive to which reference will now be made.

A bevel gear 75 is shown in Fig. 13 with a tooth space 76 whose sides 77 and 78 are already finish generated and with a tooth space 80 one side of which, 81, has also been finish generated and the other side of which, 82, has been rough generated. The dotted line 83 indicates the position of the tooth side 82 when it has been finish cut. The outside cutter 31 is shown in Figs. 8 to 12 inclusive operating in the tooth space 80 and the inside cutter 30 operates in what is to be the next adjacent tooth space 84 of the gear. The positions of the finished sides of this tooth space are indicated by the dotted lines 85 and 86 in Fig. 13.

Fig. 13 is a view of the gear 75 just prior to the cut. Fig. 8 shows the positions of the cutter and gear at an early stage of the feed movement. Fig. 9 shows the positions of the cutter and the work at a further stage of the feed movement. Fig. 10 shows the positions of the cutters and the work at the final stage of the feed movement when the inside cutter 30 has reached full depth position.

During the whole of the feed movement the work rotates in the direction of the arrow 90 and at such a rate relative to the feed movement that the outside cutting surface 91 of the cutter 30 follows the curve of the profile of the side 85 of the tooth slot 84 being cut by the cutter 30. It is evident, therefore, that the side 91 of the cutter 30 will do little or no cutting during the feed movement and that the tooth space 84 will be roughed out principally by the inside and top cutting edges 92 and 93, respectively, of the cutter 30. The cutter 31 will, of course, move parallel to the cutter 30 during the feed movement and so the outside surface 94 of this cutter will follow the curvature of the side surface 81 of the tooth slot 80. In the cutting of the first two tooth slots of the gear 75, the cutter 31 will rough out one of the tooth slots with its inside cutting edge 95 and tip cutting edge 96 the same as the cutter 30 roughs out a tooth slot with its inside and tip cutting edges. After the first two tooth slots have been cut, however, the cutter 31 operates in a tooth space previously cut by the cutter 30 and so does little or no work during the feed movement. This is true during the feed of the cutter 31 into the tooth space 80.

When full depth position has been reached by the cutter 30 one side of the tooth slot 84 will have been rough generated. This side is designated by the reference numeral 97 and it is spaced from the finished tooth surface 85 by the amount of stock to be removed in the finishing operation.

After full depth position is reached, the feed is discontinued but the blank is rolled on in the direction of the arrow 90 until the opposite side of the tooth space has been rough generated. The rate of roll of the blank with the tool after full depth position has been reached is the same as employed in ordinary practice in generating gear teeth and is as though the gear being cut were rolled with a basic gear represented by the tool. Fig. 11 shows one of the positions of the cutters and the blank during the continuation of the roll in the same direction as during the feed. The inside cutting surface 92 of the tool 30 at this stage is cutting the profile shape. The rough generated surface is designated at 98. It is spaced from the finish surface 86 by the amount of stock to be removed in the subsequent finishing operation.

During the later part of the feed movement and the continued roll of the blank in the direction of the arrow 90, the inside cutting surface 95 of the cutter 31 will do some cutting on the side surface 82 of the tooth slot 80. The amount of cutting done is indicated diagrammatically by comparison of Fig. 14 with Fig. 13. Fig. 14 is a view taken at the end of the roll in the direction of the arrow 90. It would be seen that by comparison with Fig. 13, the tooth slot 80 in Fig. 14 has been somewhat tapered. In other words, some stock has been removed from the rough generated side 82 of the tooth slot 80 during the feed and roll in the direction of the arrow 90. The side 82 has been cut away leaving a new surface 99 which is spaced from the finish tooth surface 83 by the amount of stock to be removed in the finishing operation.

When the rough generation of the side 98 is completed, the roll is reversed. The cutters remain at full depth position and the cutters and blank roll together in the opposite direction as indicated by the arrow 100 in Fig. 12. During this reverse roll, the sides 91 and 95 of the tools 30 and 31 finish generate, respectively, the opposite side tooth surfaces 85 and 83, respectively, of the tooth 102 of the gear which lies between the tooth spaces 80 and 84. Fig. 12 shows the positions of the cutters and blank at one stage in the finish generation of this tooth and Fig. 15 shows the blank at the end of the finish generating operation on this tooth. It will be noted from Fig. 15 that through the finish generating operation of the two eccentrically related cutters a tapered tooth slot 89 is produced as is desirable in tapered gears.

It will be noted that during the feed movement and roll of the blank in the direction of the arrow 90, the cutting surface 91 of the cutter 30 does little or no cutting. During feed and roll in the direction of the arrow 90, the cutting surface 95 of the cutter 31 also does but little cutting. The roughing cuts are principally taken by the side cutting surface 92 and tip cutting surface 93 of the cutter 30. The cutting surfaces 91 and 95 of the cutters 30 and 31 are therefore saved for the finishing operations and so tooth surfaces will be produced on the teeth of the gear 75 substantially as smooth as those produced by any prior known method of gear cutting.

After the cutters have completed their operations upon the tooth 102, they are withdrawn relatively from the gear blank and the blank is indexed one tooth space. Then the cutters are again fed into the blank for a new operation. So the cutting proceeds step by step until all of the teeth of the blank have been completed.

The teeth of spur gears are usually cut so as to match along their whole length. In cutting spiral bevel and hypoid gears, however, the usual practice is to cut the gear and pinion so that their mating tooth surfaces mismatch. This is especially true in the automotive field. The concave sides of the teeth are cut a little less curved than the convex sides so that stress is relieved from the tooth ends and the gear pair is less sensitive to deflections of the mounting in use. Where a pair of eccentrically related cutters are employed, however, to cut the tooth surfaces of the pinion as in the present invention, difficulties are likely to be encountered with interference between the cutters when the cutters are adjusted so that the opposite sides of the pinion teeth will be cut with the desired difference in radii of curvature. Ways in which this interference may be avoided will now be described. First of all, however, the problem encountered will be illustrated.

In Figs. 18 and 19, a pinion blank is denoted at 105. 106 denotes the position of the axis of the cutter employed to cut the mating gear. It will be seen that this axis is inclined to the root plane 107 of the pinion at an angle determined by the dedendum angles. For explanatory purposes, let it be assumed first that cutters are to be employed having spherical cutting surfaces and therefore that the tooth surfaces of gear and pinion are spherical surfaces or are derived from spherical surfaces. This tooth shape is known to be mathematically accurate and requires no "bias" correction. The centers of the spherical outside and inside surfaces of the gear cutter are then on the axis of the cutter and are designated at 108 and 109, respectively. To obtain fully matched teeth in the mating pair, the centers of the spherical cutting surfaces of the pinion cutters should coincide with the sphere centers 108 and 109 and the axes of the eccentrically related pinion cutters should pass through said centers. For practical reasons as pointed out above, however, it is desirable to have the concave sides of the pinion teeth a little less curved than the convex sides. The convex surface of one pinion cutter under this condition will then have its sphere center at 109' and the concave cutting surface of the other pinion cutter will then have its sphere center at 108'.

If now, as is the usual practice, the pinion cutters are adjusted relative to the pinion so that their axes are perpendicular to the root plane 107 of the pinion, the cutter axes would lie at 110 and 111, respectively. There would then be interference between the inner and outer cutters of the pair as indicated in Fig. 18, where the cutter discs are denoted at 115 and 116, respectively, and the cutter sides at 117 and 118, respectively.

One way of avoiding this interference is shown in Figs. 20 and 21. Here the cutters are tilted, that is, adjusted angularly so that their axes are inclined at other than right angles to the root plane of the pinion. The cutter having the outside finish cutting surface 118 is designated by the numeral 120 and the cutter having the inside finish cutting surface 117 is designated by the numeral 121. The axes of the two cutters are inclined in such manner as denoted at 122 and 123, respectively, that the profile inclination of the outside finish cutting surface 118 to the direction of the cutter axis is increased as compared with the untilted cutter and that the profile inclination of the inside finishing surface 117 is reduced. The result of this tilting of the cutters is shown clearly in Fig. 21 where it will be seen that there is no longer any interference between the cutters. The inner cutter 120 has a reduced cutting radius 124 and the outer cutter an increased cutting radius 125 as compared with the radii of the two cutters in the positions shown in Fig. 18.

Fig. 22 shows a pair of eccentric cutters 160 and 161 that have conical inside and outside cutting surfaces and that are also tilted to avoid cutter interference. The axes of the cutters are designated at 162 and 163, respectively. The dotted lines 164, 165 indicate the positions which the axes of the cutters would occupy if the axes were perpendicular to the root plane of the pinion.

If it is desired to have both cutters of a pair of tilted cutters cut to the same tooth depth, the tips of the two cutters will have different axial positions. This is shown both in Fig. 20 and Fig. 22. At full depth position in Fig. 20 the tips of both cutters should cut in the root plane 107 of the pinion. This is attained by making the tip surfaces 126 and 127, respectively, of the two cutters with different axial positions as shown. In Fig. 22, also, the tips 166 and 167, respectively, of the two cutters have different axial positions to cut in the same root plane 168.

Another way of avoiding cutter interference is by employing the method of my Patent No. 1,980,365 of Nov. 13, 1934, for eliminating "bias-bearing" when cutting two sides of the teeth simultaneously with straight sided cutters in connection with my present method for cutting simultaneously two sides of the pinion teeth. In the method of the patent referred to, an inner cutter of reduced diameter and an outer cutter of increased diameter are required and "bias-bearing" is eliminated by using a helical generating motion. The gear of the pair may be cut in the conventional manner with a "spread-blade" cutter having conical cutting surfaces, that is, with a single cutter having opposite side cutting edges of straight profile inclined to the axis of the cutter. The pinion will be cut according to the method of the present invention with a pair of eccentric cutters having conical cutting surfaces in a generating operation in which a relative movement in the direction of the axis of the basic generating gear is produced between the cutters and the pinion blank in time with the relative rolling motion about the axis of said generating gear.

The reason why the method of "bias" elimination described in my Patent No. 1,980,365 or other methods of simultaneously eliminating bias from both sides requires modified cutter diameters will now be explained with reference to Figs. 23 and 24.

Fig. 23 is a normal view of the tangential plane at a mean point P of the concave tooth side of a pinion and Fig. 24 is a similar view looking through the tooth at the convex tooth side of the pinion. These figures show very small portions of the tooth surfaces in very great enlargement. 130 and 132 denote generatrices of the two conical cutting surfaces of the gear cutter and 131 and 133 denote, respectively, the generatrices of the conical finishing surfaces of the two eccentrically mounted pinion cutters. The generatrices 130 and 131 are inclined to one another in accordance with the taper in depth of the gear and pinion teeth and the same is true of the generatrices 132 and 133. In the magnification viewed, other generatrices 131', 131'', 130', 130'', 132', 132'', 133', 133'' appear parallel to the generatrices 131, 130, 132 and 133, respectively.

One side of the gear cutter surface contacts with the tooth surface 135 of the gear in a line 136 (Fig. 23) and the other surface of the gear cutter contacts with the opposite tooth surface 137 of the gear in a line 138 (Fig. 24). The lines 136 and 138 are the normal projections of instantaneous axes to the opposite tooth surfaces 135 and 137, respectively, of the gear. Lines 136 and 138 appear as straight lines in the magnification viewed.

If the tooth surfaces of the pinion are to be truly conjugate to the gear teeth, that is, if bias is to be eliminated and the correct profile curvature is to be provided, they must also contain the lines 136 and 138, respectively, and must be tangent to the mating tooth surfaces of the gear along these lines. In sections close to and parallel to the tangential planes at P and P' the lines 139 and 139' and 140 and 140', respectively, of the opposite sides of the pinion tooth are tangent to the generatrices 130', 130'' and 132', and 132'', respectively.

The finish cutting surfaces of the pinion cutters obviously must be tangent to the pinion tooth surfaces. Generatrices 131', 131'' are therefore tangent to lines 139 and 139', respectively, and generatrices 133' and 133'' are therefore tangent to the lines 140 and 140', respectively. It is to be noted that this means also that the distance 142 of any generatrix 131'' from point P on the concave side of the pinion tooth is smaller than the corresponding distance 143 of generatrix 130'' of the gear cutter from said point P. This therefore means that an inner pinion cutter having a finishing surface of reduced radius as compared with the corresponding surface of the gear cutter must be employed to avoid "bias" as will be understood by those skilled in the art.

On the convex side of the pinion tooth, Fig. 24, the distance 144 of any generatrix 133'' of the pinion cutter from the mean point P' is larger than the distance 145 of the corresponding generatrix 132'' of the gear cutter. Inasmuch as the generatrices 133'' and 132'' lie in the same plane close to and parallel to the tangential plane at P', this characteristic indicates that the diameter of the finishing surface of the outer pinion cutter is increased and greater than the surface of the gear cutter which cuts the mating side of the gear tooth.

Cutter interference may therefore be avoided where eccentric cutters are employed to finish cut simultaneously two side surfaces of the pinion teeth according to the present invention by employing the "bias" eliminating method of my prior patent. The two discussed remedies against cutter interference may also be combined and employed simultaneously wherever necessary.

Still another method may be employed for avoiding cutter interference and this, too, may be combined with either of the methods previously described or with both. This is illustrated diagrammatically in Fig. 25.

150 designates a tooth of a pinion 151 to be generated. In broken lines, I have shown the positions of a pair of eccentric cutters whose cutting surfaces 152 and 153, respectively, are of the pressure angle at which the finished pinion will mesh with its mating gear and are adapted to finish cut the opposite side surfaces of the pinion teeth 150. In full lines, I have shown the positions of another pair of eccentrically mounted pinion cutters whose finish cutting surfaces 154 and 155 are of smaller pressure angle than the surfaces 152 and 153, respectively, but are also intended to finish cut the opposite sides of the pinion tooth 150. It is well known in the gear art that tools of different pressure angles may be employed to generate the same tooth surface of any given pressure angle by rolling different surfaces of the work on the basic gear represented by the tool. Thus, in Fig. 25, the pinion 151 may be rolled with its surface 156 on the basic gear represented by the cutter to generate with the cutting surfaces 152 and 153, a pinion tooth 150 of the profile curvature shown. The same tooth 150 may be produced also by the cutting surfaces 154 and 155 when the pinion 151 rolls relative to the cutter as though its surface 157 were rolling with the basic gear represented by the tools.

It will be noted that the cutting surfaces 154 and 155 of smaller pressure angle are much further apart than the cutting surfaces 152 and 153 of larger pressure angle. Therefore, there is less likelihood of interference between cutters having cutting surfaces of smaller pressure angle than between cutters having cutting surfaces of larger pressure angle and so another method of avoiding interference between eccentrically mounted cutters is indicated.

The invention may be practiced on different known types of gear cutting machines. Thus a machine constructed substantially according to the U. S. Patent of Carlsen No. 2,000,215 may be employed. In this machine, the feed movement is in the direction of the axis of the cradle or basic generating gear. If, then, the cutter which is to do the principal amount of roughing is mounted so that the side of this cutter which is to do the finishing is substantially parallel to the axis of the cradle, then the feed movement will be substantially in the direction of this side of the cutter and so this side will do no cutting during feed, but will be saved for finishing. In this case the rate of roll during feed may be the same as during finishing.

The invention may also be practiced on a machine such as described in my above mentioned copending application, Serial No. 33,833 in which the feed movement produces a rotational movement of the cradle and the rate of roll of cradle and work is different during feed from the rate after full depth position is reached. In this case, the rate of roll during feed will be so selected that one side of the cutter which does the principal roughing work will be saved from any heavy cutting during feed so that it will be able to cut with the desired smoothness during finish cutting.

Reference may be had to my application Ser. No. 33,833 for a further explanation of the manner of operation of both the machine last mentioned as well as the Carlsen machine. Other types of machines also may be used for practicing the present invention as will be apparent to those skilled in the art.

The invention has been described in connection with several different embodiments thereof, but it is capable of further modification. This application is intended to cover any variations, uses, or adaptations of the invention following, in general, the principle of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A mechanism for cutting longitudinally curved tooth gears comprising a tool spindle, a face-mill gear cutter rigidly secured to said tool spindle, a second face-mill gear cutter mounted in eccentric relation to the first cutter, a driving member operatively connecting the second cutter with the first cutter and movable radially of the axis of the tool spindle during rotation of the tool spindle to maintain said operative connection, and means for driving the tool spindle to rotate both cutters simultaneously.

2. A mechanism for cutting longitudinally curved tooth gears comprising a tool spindle, a face-mill gear cutter rigidly secured to said tool spindle, a second face-mill gear cutter, means for adjusting said second cutter relative to said spindle both radially and angularly thereof, a floating key member operatively connecting the second cutter with the tool spindle and movable relatively to the second cutter and the tool spindle during rotation of the spindle, and means for driving one of said cutters to drive the other also through said floating key connection.

3. A mechanism for cutting longitudinally curved tooth gears comprising a tool spindle, a support in which the tool spindle is journaled, a carrier adjustable radially on said support, a face-mill gear cutter rotatably mounted on said carrier, a floating key member operatively connecting the tool spindle and carrier and adapted to drive said carrier from said spindle in any position of adjustment of said carrier, and a second face-mill gear cutter rigidly secured to the tool spindle and of smaller diameter than the first cutter so as to be mounted therein.

4. A mechanism for cutting longitudinally curved tooth gears comprising a pair of face-mill gear cutters that are eccentrically mounted one within the other and adjustable relative to one another to vary the amount of their eccentricity, means for rotating one of said cutters and means for driving the other cutter from the first.

5. A mechanism for cutting longitudinally curved tooth gears comprising a pair of face-mill gear cutters that are eccentrically mounted one within the other and adjustable relative to one another to vary the amount of their eccentricity and so that they may be spaced apart to operate in two different tooth spaces of a gear blank simultaneously, a rotatable tool spindle to which one of the cutters is secured, and means for rotatably driving the other cutter from said tool spindle in any position of its eccentric adjustment.

6. A mechanism for cutting longitudinally curved tooth gears comprising a pair of face-mill gear cutters that are eccentrically mounted one within the other, the outside cutter having inwardly directed finish cutting edges for finish-cutting the convex side tooth surfaces of a gear and the inside cutter having outwardly directed finish cutting edges for finish-cutting the concave side tooth surfaces of a gear whereby the two cutters may simultaneously finish cut opposite sides of a gear tooth, and means for simultaneously rotating said cutters.

7. A mechanism for cutting longitudinally curved tooth gears comprising a pair of face-mill gear cutters that are eccentrically mounted one within the other and are spaced apart so as to operate in two adjacent tooth spaces of a gear blank simultaneously, said cutters having the same number of cutting blades and the blades of one cutter being arranged in substantial peripheral alignment with the blades of the other cutter and means for rotating the two cutters simultaneously.

8. A mechanism for cutting longitudinally curved tooth gears comprising an angularly movable support, means for adjusting said support angularly, a cutter spindle journaled in said support coaxially of the axis of adjustment of said support, a pair of face-mill gear cutters of different diameters, means for mounting one of said cutters on said spindle, a carrier adjustable on said support in a direction at right angles to the axis of the cutter spindle, means for rotatably mounting the other cutter on said carrier, and an operative driving connection between said latter cutter and the spindle.

9. A mechanism for cutting longitudinally curved tooth gears comprising a pair of face-mill gear cutters having cutting teeth extending substantially in the direction of the cutter axes, means for mounting said cutters eccentrically and with their axes inclined at other than right angles to the root plane of the gear to be cut and so that the tips of the cutting teeth of the two cutters have different axial positions, and means for imparting rotation to said cutters.

10. The method of producing longitudinally curved tooth tapered gears which comprises simultaneously finish-cutting opposite sides of a tooth of the gear by rotating independently mounted face-mill gear cutters about different centers so as to move the cutters in conformity to two eccentrically related circles then withdrawing the cutters relatively from the gear blank and indexing the blank.

11. The method of cutting a longitudinally curved tooth gear which comprises employing a pair of face-mill gear cutters that are mounted one within the other and spaced so as to operate simultaneously in adjacent tooth spaces of the blank, producing a relative feed movement between said cutters and the blank while rotating the blank in one direction to rough cut the tooth spaces and, after full depth position is reached, reversing the direction of rotation of the blank and rolling the blank relative to the cutters to finish cut opposite sides of a tooth of the blank.

12. The method of cutting a longitudinally curved tooth gear which comprises employing a pair of face-mill gear cutters that are mounted one within the other and spaced so as to operate simultaneously in adjacent tooth spaces of a blank, producing a relative feed movement between said cutters and the blank while rotating the blank in one direction at such a rate that during the feed movement one side cutting edge of the cutter which cuts into the solid blank does little or no cutting and reversing the direction of rotaton of the blank after the cutter has reached full depth position and rolling the blank and cutters together to cause said cutting surface and the adjacent cutting surface of the other cutter to finish cut opposite sides of a tooth of the gear, then withdrawing the cutters relatively from the blank and indexing the blank one tooth space.

13. The method of cutting a longitudinally curved tooth gear which comprises employing a pair of face-mill gear cutters that are eccentrically mounted one within the other and spaced so as to operate simultaneously in adjacent tooth spaces of a blank, producing a relative feed movement between said cutters and the blank while rotating the blank in one direction at such a rate that during the feed movement one side cutting surface of the cutter which cuts into the solid blank, does little or no cutting and reversing the direction of rotation of the blank, after the cutters have reached full depth position, and rolling the blank and cutters together to cause said cutting surface and the adjacent cutting surface of the other cutter to finish cut opposite sides of a tooth of the gear, then withdrawing the cutters relatively from the blank and indexing the blank one tooth space.

14. The method of cutting a longitudinally curved tooth tapered gear which comprises employing a pair of face-mill gear cutters that are eccentrically mounted one within the other and spaced so as to operate simultaneously in adjacent tooth spaces of a blank, and producing a relative feed movement between the cutters and blank until the cutters reach full depth position, while rotating the blank on its axis in one direction and simultaneously producing a relative movement of translation between the cutters and blank in one direction in such timed relation to the rotational and feed movements that one side of one tool follows approximately one side of the tooth space of the blank in which said tool is operating and stock is removed from said tooth space principally by the opposite side and tip of said tool, discontinuing the feed movement when the tools have reached full depth position but continuing the rotational and translatory movements in the previous directions until the side of the tooth space opposite the side first specified is rough generated, and then reversing the directions of the rotational and translatory movements so that the other side of said cutter and the adjacent side of the other cutter finish generate the opposite sides of the tooth lying between the two tooth spaces in which the tools are operating.

15. The method of producing gears which comprises employing a pair of face-mill gear cutters that are eccentrically mounted one within the other and spaced so as to operate simultaneously in adjacent tooth spaces of a blank, producing a relative feed movement between said cutters and the blank for roughing out adjacent tooth spaces of the blank and, after full depth position is reached, rolling the cutters and blank relative to one another so as to cause the cutters to finish generate simultaneously opposite sides of the tooth of the blank lying between said tooth spaces, then withdrawing the cutters relatively from the blank and indexing the blank one tooth space.

16. The method of producing gears which comprises successively roughing out two adjacent tooth slots of a gear blank and then finish cutting opposite sides of the tooth lying between said two slots from different centers and with different radii of curvature and during feed and rolling movement of the cutters and blank, then withdrawing the cutters relatively from the blank and indexing the blank.

17. The method of producing a gear which comprises employing a pair of tools adapted to cut simultaneously in adjacent tooth spaces of a gear blank, feeding the tools into the blank to rough cut the tooth spaces of the blank and then rolling the tools with the blank to generate opposite sides of the tooth between said spaces from different centers and with different radii of curvature, then withdrawing the cutters relatively from the blank and indexing the blank.

18. The method of cutting a gear which comprises employing a pair of cutting tools, each of which has opposite side cutting edges and which are spaced apart to cut simultaneously in two adjacent tooth spaces of a gear blank, feeding the tools together into the blank while rotating the blank at such a rate relative to the feed that one side surface of one tool follows the profile of a tooth surface of the gear to be cut and, after full depth position has been reached, rolling the tools and the blank relative to one another in the manner of a gear meshing with a basic gear represented by the tools and in such a direction that the adjacent side cutting edges of the two tools finish-cut opposite sides of the tooth of the gear lying between the two tooth spaces.

19. The method of cutting a longitudinally curved tooth gear which comprises employing a pair of eccentrically related face-mill gear cutters, each of which has opposite side cutting edges and which are spaced apart to cut simultaneously in two adjacent tooth spaces of a gear blank, feeding the tools together into the blank while rotating the blank at such a rate relative to the feed that the outside surface of the inner cutter follows a profile of a tooth surface of the gear and, after full depth position has been reached, rolling the cutters and blank relative to one another in the manner of a gear meshing with a basic gear represented by the cutters and in such a direction that the adjacent side cutting edges of the two cutters finish-cut opposite sides of the tooth of the gear which lies between the two tooth spaces.

20. The method of cutting a gear which comprises employing a pair of cutting tools, each of which has opposite side cutting edges and which are spaced apart to cut simultaneously in two adjacent tooth spaces of a gear blank, feeding the tools together into the blank while rotating the blank in one direction in time with the feed movement until the tools reach full depth cutting position and thereafter reversing the direction of rotation of the blank and rolling the blank relative to the tools to generate opposite sides of the tooth which lies between the two tooth spaces.

21. The method of cutting a gear which comprises employing a pair of eccentrically related face-mill gear cutters, each of which has opposite side cutting edges and which are spaced apart to cut simultaneously in two adjacent tooth spaces of a gear blank, feeding the cutters together into the blank while rotating the blank in one direction in time with the feed movement until the cutters reach full depth cutting position and thereafter reversing the direction of rotation of the blank and rolling the blank relative to the cutters to generate opposite sides of the tooth which lies between the two tooth spaces.

22. A mechanism for cutting longitudinally curved tooth gears comprising a tool spindle, a face-mill gear cutter secured thereto, a second face-mill gear cutter mounted to be adjustable angularly about the axis of said spindle and radially with reference thereto to offset the axis of the two cutters from one another, means for driving the second cutter from the tool spindle in any position of its adjustment, and means for driving the tool spindle.

23. The method of cutting a longitudinally curved tooth gear which comprises employing a pair of eccentrically related face-mill gear cutters, mounting said cutters relative to a gear blank so that their axes are inclined at other than right angles to the root surface of the gear blank and the tip surfaces of the two cutters are displaced axially with reference to one another and so that the cutters will operate in adjacent tooth spaces of the blank, and rotating the cutters in engagement with the blank while producing a relative rolling movement therebetween.

24. The method of cutting longitudinally curved tooth tapered gears which comprises employing a pair of face-mill gear cutters that are eccentrically mounted one within the other and spaced so as to operate in two different tooth spaces of a gear blank simultaneously and each of which has side cutting edges that are adapted to cut opposite sides of a tooth space, and rotating the cutters in engagement with the gear blank while producing a relative rolling movement between the cutters and the blank.

ERNEST WILDHABER.